L. G. RILEY AND S. B. SCHENCK.
MOTOR CONTROL SYSTEM.
APPLICATION FILED MAR. 14, 1921.

1,437,075.

Patented Nov. 28, 1922.

WITNESSES:
L. F. Sonnemann
H. C. Lowe

INVENTORS
Lynn G. Riley and
Samuel B. Schenck.
BY Wesley G. Carr
ATTORNEY

Patented Nov. 28, 1922.

1,437,075

UNITED STATES PATENT OFFICE.

LYNN G. RILEY, OF WILKINSBURG, AND SAMUEL B. SCHENCK, OF EDGEWOOD PARK, PENNSYLVANIA, ASSIGNORS TO WESTINGHOUSE ELECTRIC AND MANUFACTURING COMPANY, A CORPORATION OF PENNSYLVANIA.

MOTOR-CONTROL SYSTEM.

Application filed March 14, 1921. Serial No. 452,057.

*To all whom it may concern:*

Be it known that we, LYNN G. RILEY, a citizen of the United States, and a resident of Wilkinsburg, in the county of Allegheny and State of Pennsylvania, and SAMUEL B. SCHENCK, a citizen of the United States, and a resident of Edgewood Park, in the county of Allegheny and State of Pennsylvania, have invented a new and useful Improvement in Motor-Control Systems, of which the following is a specification.

Our invention relates to motor-control systems and it has particular relation to control systems in which a plurality of motors are accelerated by being first connected in series and afterwards in parallel relation.

One object of our invention is to provide a system of control for a plurality of motors that shall vary the excitation of the field-magnet winding of each of the motors although employing but relatively few switches and which shall prevent unequal division of the current through different portions of the field-magnet windings of the motors, when they are connected in parallel relation.

A second object of our invention is to prevent the reverse operation of the transition switches, when the master controller which governs their operation is actuated in a reverse direction, thereby lessening wear and burning of the transition switches.

A third object of our invention is to provide means for preventing the switches that govern the excitation of the field-magnet windings of the motors from opening while the controller is being actuated to its "off" position.

Heretofore, where motors have been connected in groups and these groups connected first in series relation and later in parallel relation during the acceleration of the motors, the transition switches have not been employed to coact with the field switches to vary the excitation of the field-magnet windings of the motors.

Briefly speaking, our invention consists in providing a system of control for a plurality of groups of motors, whereby the groups of motors are connected first in series relation and secondly in parallel relation and, upon the motors being connected in full parallel relation, the excitation of the field-magnet winding of each motor is lessened by operating the field switches and transitional switches to decrease the portions of the field windings that are energized. Upon the master controller being operated in a reverse direction, the series and the parallel contactors remain open and also, the excitation of the field-magnet winding of each of the motors is not increased by the operation of the control switches.

For a better understanding of our invention, reference may be made to the accompanying drawing—

Figure 1 of which is a schematic view of the main circuits of a motor-control system embodying our invention;

Figure 1:
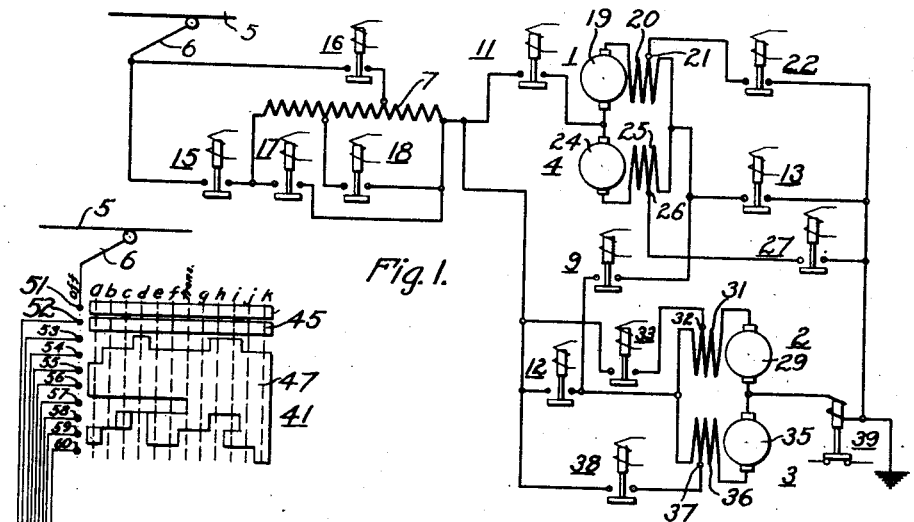

Referring to Figure 1, a motor-control system comprising a plurality of motors 1, 2, 3 and 4 is energized from a source of energy, such as a trolley 5, through a trolley-pole 6 and a starting resistor 7. A switch or contactor 9 is employed for connecting the group comprising motors 1 and 4, which are permanently parallel-connected in series relation with the group comprising motors 2 and 3, which are also permanently parallel-connected.

A switch or contactor 11 is employed for opening and closing a circuit comprising the group of motors 1 and 4. A parallel contactor 12 and a ground contactor 13 are employed for connecting the group of motors 1 and 4 in parallel relation to the group of motors 2 and 3.

The series contactor 9, parallel contactor 12 and ground contactor 13 will be referred to as the transitional contactors, in accordance with engineering practice. Accelerating contactors 15, 16, 17 and 18 are employed for shunting portions of the starting resistor 7, as is customary.

The motor 1 is provided with an armature 19 and a series field-magnet winding 20. The series field-magnet winding 20 is provided with a tap-point 21 which may be electrically connected by a contactor 22 beyond the ground contactor 13 to ground. The motor 4 is provided with an armature 24 and a field-magnet winding 25, which is provided with a tap-point 26. The tap-point 26 may also be electrically connected, by the contactor 27, beyond the ground contactor 13 to ground.

The motor 2 is provided with an armature 29 and a field-magnet winding 31, which has a tap-point 32. The tap-point 32 may be electrically connected by a contactor 33 to a point in the control system between the starting resistor 7 and the parallel contactor 12. The motor 3 is provided with an armature 35 and a field-magnet winding 36, which is provided with a tap-point 37. Tap-point 37 may also be electrically connected by a contactor 38 to a point in the control system between the starting resistor 7 and the parallel contactor 12.

An overload relay 39 has its actuating coil connected in series relation with the motors 2 and 3 for preventing an electrical overload upon the control system. The operation of the relay in the control system will be hereinafter set forth more fully.

Figure 2:
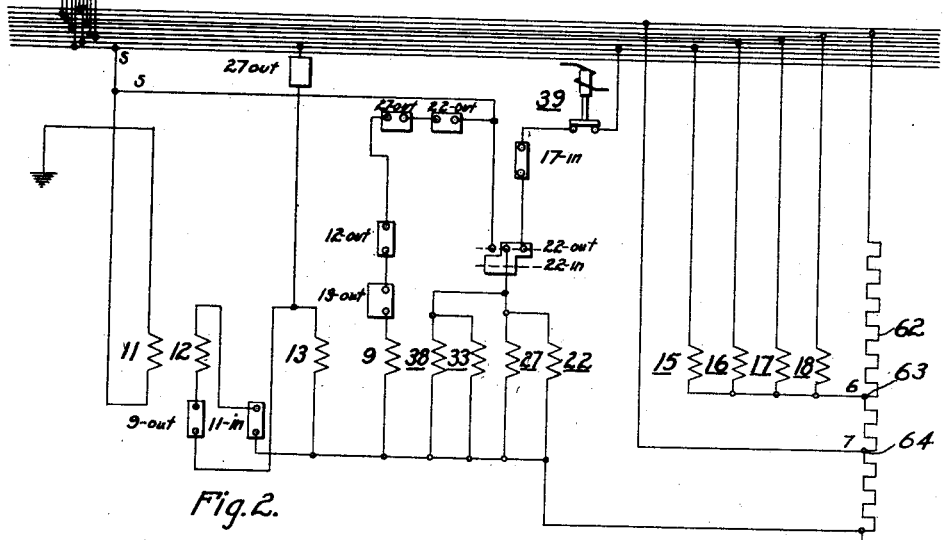
Fig. 2 is a diagrammatic representation of the auxiliary circuits for governing the switches of the control system shown in Fig. 1.

Referring to Fig. 2, a master controller 41 having an "off" position and a plurality of operating positions $a$ to $k$, inclusive, is employed to govern the operation of the contactors shown in Fig. 1.

Figure 4:
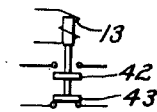
Fig. 3 is a sequence chart showing the order in which the principal contactors shown in Fig. 1 close and Fig. 4 is a diagrammatic view of a contactor and auxiliary contact members and interlocks operated thereby.

For a better understanding of the operation of the electrical interlocks shown diagrammatically in Fig. 2, the electrical interlock or auxiliary contact member upon the ground contactor 13 is shown in Fig. 4. The ground contactor 13 is provided with a main contact member 42 and an auxiliary contact member 43. When the main contact member 42 of the ground contactor 13 is actuated to its upper or closed position, a circuit comprising the lower contact or auxiliary member 43 is opened. When the main contactor 42 is in its open position, the auxiliary contact member 43 is inserted in circuit.

The master controller 41 is provided with a plurality of contact segments 45 and 47 and a plurality of contact fingers 51 to 60, inclusive.

The operation of the control system is begun by actuating the master controller 41 from the "off" position to position $a$, thereby establishing a circuit from the trolley 5 through the trolley-pole 6, contact terminal 51, contact segment 45 and contact terminal 52 of the master controller, and control resistor 62, to ground. The actuating coils of the accelerating and field contactors, or switches, are energized through the control resistor 62, in accordance with well-known practice.

When the controller 41 is in position $a$, a circuit is established from the tap-point 63 of the control resistor 62 through the actuating coil of the accelerating contactor 15, contact terminal 59 of the controller 41, contact segment 47 and contact terminal 56 to tap-point 64 of the control resistor 62. In position $a$, a circuit is established from tap-point 64 of control resistor 62 through contact terminal 56, contact segment 47 of the master controller 41, contact terminal 55 and actuating coil of contactor 11 to ground.

When the master controller 41 is in position $a$, another circuit is established from tap-point 64 of control resistor 62 through contact terminal 56, contact segment 47 of master controller 49, contact terminal 55, interlock 22-out, 27-out, 12-out and 13-out and the actuating coil of series contactor 9 to ground.

Figure 3:
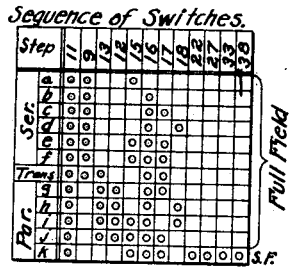

Upon closure of contactors 9, 11 and 15, (see position $a$ of sequence chart shown in Fig. 3) a circuit is established from the trolley 5 through contactor 15, starting resistor 7, contactor 11, armatures 19 and 24 and series field-magnet windings 20 and 25 of the motors 1 and 4, respectively, which are connected in permanent parallel relation, series contactor 9, series field-magnet windings 31 and 36 and armatures 29 and 35 of the motors 2 and 3, respectively, which are connected in permanent parallel relation, and the actuating coil of the relay 39 to ground.

The motors 1, 2, 3 and 4 are accelerated by actuating the controller 41 to position $b$, thereby closing accelerating contactor 16 by establishing a circuit from the tap-point 63 of control resistor 62 through the acuating coil of accelerating contactor 16, contact terminal 54, contact segment 47 of the master controller 41 and contact terminal 56 to tap-point 64 of the control resistor 62. The actuating coil of accelerating contactor 15 is de-energized, when the controller 41 is actuated to position $b$, thereby permitting the contactor 15 to open.

When the master controller 41 is actuated to position $c$, a circuit is established from the tap-point 63 of the control resistor 62 through the actuating coil of contactor 17, contact terminal 58, contact segment 47 of the master controller 41, and contact terminal 56 to tap-point 64 of the control resistor 62. Accelerating contactor 16 remains closed, in accordance with the sequence chart, shown in Fig. 3.

When the master controller 41 is actuated to position $d$, a circuit is established from tap-point 63 of control resistor 62 through the actuating coil of accelerating contactor 18, contact terminal 52, contact segment 47 of master controller 41 and contact terminal 56 to tap-point 64 of control resistor 62. In accordance with the design of contact segment 47, the circuit comprising the actuating coil of the accelerating contactor 17 is broken, thereby permitting the contactor 17 to open. Accelerating contactor 16 remains closed through the circuit that has already been described.

When the master controller 41 is actuated to position e, a circuit comprising accelerating contactor 15 and contact terminal 59 of the master controller 41 is again established, thereby causing the contactor 15 to close and thus further accelerate the motors 1, 2, 3 and 4. The contactor 18 resumes its open position, as shown by position e of Fig. 3.

When the master controller 41 is actuated to position f, which is the full speed series position, contactors 9, 11, 15, 16 and 17 remain closed and the group of motors 1 and 4 are connected in series relation with the group of motors 2 and 3.

Upon the controller 41 being actuated through the transition position, a circuit comprising the contact terminal 59 and the actuating coil of the contactor 15 is broken, thereby permitting the contactor 15 to open.

When the master controller 41 is actuated to position g, a circuit is established from the tap-point 64 of the controller resistor 62 through contact terminal 56, contact segment 47 of the master controller 41, contact terminal 57, interlock 27-out and the actuating coil of the ground contactor 13 to ground.

When the ground contactor 13 closes, the circuit comprising the actuating coil of the series contactor 9 is broken by the interlock 13-out. When the series contactor 9 is in its open position, a circuit is established from the tap-point 64 of the control resistor 62 through contact terminal 56, contact segment 47 of the master controller 41, contact terminal 57, interlocks 27-out and 9-out, actuating coil of the parallel contactor 12 and interlock 11-in to ground.

When the parallel contactor 12 assumes its closed position, a second gap is made in the circuit comprising the actuating coil of the series contactor 9 by the interlock 12-out.

When the controller 41 is actuated to position g, contactors 11, 12, 13, 16 and 17 are closed (see sequence chart shown in Fig. 3), thereby connecting the motors 1 and 4 in parallel relation with the motors 2 and 3.

When the master controller 41 is actuated to position h, a circuit is established from the tap-point 63 of the control resistor 62 through the actuating coil of accelerating contactor 18 and contact terminal 53, contact segment 47 of the controller 41 and contact terminal 56 to tap-point 64 of control resistor 62. The actuating coil of the contactor 17 is de-energized, as the contact terminal 58 no longer engages the contact segment 47 of the master controller 41.

When the master controller is actuated to position i, a circuit is established from the tap-point 63 of the control resistor 62 through the actuating coil of the contactor 15, contact terminal 59, contact segment 47, and contact terminal 56 to tap-point 64 of the control resistor 62, thereby closing accelerating contactor 15. Various portions of the starting resistor 7 are connected in parallel relation by the accelerating contactors 15, 16 and 18 being closed.

When the master controller 41 is actuated to position j, a circuit is established from the tap-point 63 of the control resistor 62 through the actuating coil of contactor 17, contact terminal 58, contact segment 47 of controller 41 and contact terminal 56 to tap-point 64 of control resistor 62. When the controller 41 is actuated to position j, the accelerating contactor 18 is opened, as the actuating coil thereof is de-energized by contact terminal 53 no longer engaging contact segment 47 of the master controller 41.

The starting resistor 7 has now been completely shunted and further acceleration of the motors 1, 2, 3 and 4 is secured by reducing the portion of each of their respective fields that is energized. This result is accomplished, when the master controller 41 is actuated to position k, thereby establishing a circuit from tap-point 64 of control resistor 62 through contact terminal 56, contact segment 47 of controller 41, contact terminal 60, contact members of the overload relay 39, interlock 17-in of accelerating contactor 17, interlock 22-out of field contactor 22 and the parallel-connected actuating coils of the field contactors 22, 27, 33 and 38 to ground.

As the actuating coils of the field contactors 22, 27, 33 and 38 are connected in parallel relation the contactors 22, 27, 33 and 38 are, therefore, both closed and opened simultaneously. The motors 1, 2, 3 and 4 are now operating with reduced fields and all the starting resistors have been shunted. The car or locomotive, upon which the motors 1, 2, 3 and 4 are mounted, will now be operated at full speed.

If the current through the motors 2 and 3 is excessive, the overload relay 39 will open, thereby breaking the circuit that comprises the actuating coils of the field contactors 22, 27, 33 and 38, and thus opening these contactors to increase the active value of all the motor field windings. Once the field contactors 22, 27, 33 and 38 are closed, they will remain closed, until the master controller 41 is actuated to the "off" position, as a holding circuit is established from tap-point 64 of the control resistor 62 through contact terminal 56, contact segment 47 of the controller 41, contact terminal 55, interlock 22-in of field contactor 22 and the parallel-connected actuated coils of the contactors 22, 27, 33 and 38 to ground.

The series contactor 9 will remain open, when the master controller 41 is operated in the reverse direction, as interlock 27-out breaks the circuit comprising the actuating coil of the contactor 9. Parallel contactor 12 will open, when the master controller 41 is actuated in the reverse direction beyond the transition position, as contact terminal 57 will no longer engage contact segment 47 of the master controller 41.

However, before the circuit comprising the contact members of the parallel contactor 12 is broken, accelerating contactor 15 is opened, as shown in position $h$ thereby inserting portions of the starting resistor 7 in circuit with the motors 1, 2, 3 and 4, and thus lessening the arcing that occurs upon the opening of the parallel contactor 12.

From the above description, it is apparent that upon the controller 41 being actuated to the "off" position, the transitional switches, comprising the series contactor 9, parallel contactor 12 and ground contactor 13, will not operate to change the connections of the groups of motors 1 and 4, and 2 and 3 from parallel to series relation. This condition lessens the wear upon the transition switches. Furthermore, by maintaining the field contactors 22, 27, 33 and 38 closed, when the master controller 41 is actuated in a reverse direction, wear of these contactors is lessened.

Since the system is so designed that upon the master controller 41 being actuated to full running position $k$ and then actuated to any of the series positions, $a$, $b$, $c$, $d$, $e$ or $f$, the series contactor 9 does not close, and it will not be possible to run the motors in series relation with reduced fields.

While we have shown our invention in a preferred form, it is apparent that minor modifications may be made in the arrangement of circuits and parts without departing from the spirit and scope of our invention. We desire, therefore, to be limited only by the scope of the appended claims.

We claim as our invention:—

1. The combination with a plurality of severably connected groups of dynamo-electric machines, each of said machines having an armature and a field winding, of a switch for connecting said groups of machines in series relation, a plurality of switches for connecting said groups of machines in parallel relation, and a single switch for each field winding for independently permitting full-field and reduced-field excitation.

2. The combination with a plurality of groups of dynamo-electric machines, the machines of each group being connected permanently in parallel relation and each of said machines having an armature and a field winding, of means for connecting said groups of machines in series and in parallel relation and means corresponding to the respective machines of each group for coacting with said first means to secure full-field and reduced-field excitation.

3. The combination with a plurality of groups of motors severally having armatures and series field-magnet windings, the motors of each group being connected permanently in parallel relation, of means for connecting said groups of motors in series and in parallel relation, and means corresponding to the respective machines of each group for coacting with said first means to vary the excitation of said windings.

4. The combination with a plurality of severably connected groups of motors severally having armatures and series field-magnet windings, of means for connecting said groups of motors in series and in parallel relation and means comprising a single contactor for each of said windings for varying the excitation thereof.

5. The combination with a plurality of severably connected groups of motors severally having armatures and series field-magnet windings, of means for connecting said groups of motors in series and in parallel relation, and means corresponding to each of said windings for coacting with said first means to vary the excitation of said windings.

6. The combination with a plurality of severably connected groups of motors, the motors of each group being connected in parallel relation and each motor being provided with a series field-magnet winding, of a contactor for connecting groups of said motors in series, a plurality of contactors for connecting said groups of motors in parallel, and a contactor for each of said windings for varying the excitation thereof by co-operating with said parallel contactors.

7. The combination with a plurality of groups of dynamo-electric machines, each having an armature and a field winding and each of the field windings being provided with a tap-point, the machines of each group being permanently connected in parallel relation, of a contactor for joining the outer ends of the field windings to connect the groups of motors in series relation, two contactors for joining said groups of motors in parallel relation, and a plurality of field contactors for independently joining the tap-point of each of said windings beyond one of said parallel connecting contactors, said field contactors co-operating with said parallel contactors for independently lessening the energization of each of said windings.

8. The combination with a plurality of dynamo-electric machines, of a controller, means governed by said controller for connecting said machines in two different relations upon said controller being actuated in one direction and means for preventing said motors from being connected in a different relation upon said controller being actuated in another direction.

9. The combination with a plurality of groups of dynamo-electric machines, of a controller, means governed by said controller for connecting said groups in series and in parallel relation upon said controller being actuated in one direction and means for preventing said means from connecting said motors in series relation upon said controller being actuated in another direction.

10. The combination with a plurality of groups of motors, of a controller having an "off" position and a plurality of operating positions, a contactor governed by said controller for connecting said motors in series relation, a plurality of contactors governed by said controller for connecting said motors in parallel relation, and means for preventing said series and parallel contactors from operating to connect said groups in series relation upon said controller being actuated in a reverse direction through its operating positions.

11. The combination with a plurality of dynamo-electric machines, each of said machines having a field winding provided with a tap-point, of a controller, means comprising a plurality of field switches for connecting the tap-points of said windings for varying the excitation thereof upon said controller being actuated in a forward direction and means for preventing said field switches from operating upon said controller being actuated in a reverse direction.

12. The combination with a plurality of motors, each of said motors having a field winding, of a controller, a plurality of switches governed by said controller for connecting said motors in series and parallel relation, and means governed by said controller for varying the excitation of said windings, said means and said switches maintaining their positions corresponding to the full speed of the motors during the period said controller is actuated to its "off" position.

13. The combination with a plurality of motors, each of said motors having a field winding, of a controller, means for connecting said motors in series and in parallel relations, means for lessening the excitation of said windings after said motors are connected in parallel relation and means for preventing said motors from being connected in series relation after the excitation of said windings has been decreased.

14. The combination with a plurality of groups of motors, the motors of each group being permanently connected in parallel relation, each of said motors having a field-magnet winding provided with a tap-point, of a series contactor for connecting said groups of motors in series relation, a plurality of contactors for connecting said groups of motors in parallel relation, and a plurality of field contactors for independently connecting said tap-points in each group to vary the excitation of said windings, said parallel contactors opening upon the closing of said field contactors.

In testimony whereof, we have hereunto subscribed our names this 4th day of March, 1921, and this 7th day of March, 1921, respectively.

LYNN G. RILEY.
SAMUEL B. SCHENCK.